(12) United States Patent
Corniot

(10) Patent No.: US 7,648,062 B2
(45) Date of Patent: Jan. 19, 2010

(54) METHOD AND DEVICE FOR TREATING A SET OF COMPONENTS FOR THE WHEEL OF A VEHICLE

(75) Inventor: Philippe Corniot, Enval (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 706 days.

(21) Appl. No.: 11/250,586

(22) Filed: Oct. 14, 2005

(65) Prior Publication Data

US 2006/0136782 A1 Jun. 22, 2006

Related U.S. Application Data

(63) Continuation of application No. PCT/FR2004/000861, filed on Apr. 7, 2004.

(30) Foreign Application Priority Data

Apr. 16, 2003 (FR) .................................. 03 04739

(51) Int. Cl.
| | |
|---|---|
| G06K 15/00 | (2006.01) |
| G06K 7/00 | (2006.01) |
| G06K 19/00 | (2006.01) |
| G07B 15/02 | (2006.01) |
| G06F 19/00 | (2006.01) |
| G06F 17/00 | (2006.01) |
| G06Q 30/00 | (2006.01) |
| G06Q 90/00 | (2006.01) |
| B60R 25/10 | (2006.01) |
| B60C 23/00 | (2006.01) |
| G08B 13/14 | (2006.01) |
| B60C 23/02 | (2006.01) |

(52) U.S. Cl. .................... 235/375; 235/383; 235/384; 235/385; 235/435; 235/487; 340/426.33; 340/572.1; 340/442

(58) Field of Classification Search ................. 235/375, 235/383–385, 435, 487, 492, 493; 340/572.1, 340/426.33, 442, 447; 73/146.2; 157/1.1, 157/11

See application file for complete search history.

(56) References Cited

U.S. PATENT DOCUMENTS 4,274,739 A * 6/1981 Grubbs et al. ............... 356/155

(Continued)

FOREIGN PATENT DOCUMENTS

EP 1207061 5/2002

*Primary Examiner*—Daniel Walsh
(74) *Attorney, Agent, or Firm*—Fitzpatrick, Cella, Harper & Scinto

(57) ABSTRACT

A method is presented for maintaining a set of at least two components from a group including a wheel rim, a tire and a safety support element, the method including the following steps: providing a set of components, wherein at least one of the components is provided with an information carrier that can be automatically read and is configured to supply at least one data element for use in carrying out the desired maintenance on the set; said set is brought to a maintenance machine that is configured to carry out the desired maintenance on the set under the control of a programmable data management unit; the information carrier of at least one of the components of the set brought to the machine is automatically read and the data is automatically transmitted to the programmable unit; the machine is regulated on the basis of the data transmitted; and the desired maintenance for the set is initiated and carried out by means of the machine.

31 Claims, 4 Drawing Sheets

U.S. PATENT DOCUMENTS

| | | | |
|---|---|---|---|
| 4,504,919 A * | 3/1985 | Fujii et al. | 700/228 |
| 5,557,268 A * | 9/1996 | Hughes et al. | 340/933 |
| 5,884,202 A * | 3/1999 | Arjomand | 701/29 |
| 5,969,247 A * | 10/1999 | Carter et al. | 73/462 |
| 6,029,716 A * | 2/2000 | Hawk | 141/38 |
| 6,087,930 A * | 7/2000 | Kulka et al. | 340/447 |
| 6,234,232 B1 | 5/2001 | Kane et al. | 157/1.24 |
| 6,281,796 B1 * | 8/2001 | Canipe et al. | 340/572.3 |
| 6,442,460 B1 * | 8/2002 | Larson et al. | 701/33 |
| 6,587,768 B2 * | 7/2003 | Chene et al. | 701/33 |
| 6,619,362 B2 * | 9/2003 | Corghi | 157/1.24 |
| 6,724,301 B2 * | 4/2004 | Ginman et al. | 340/447 |
| 6,822,582 B2 * | 11/2004 | Voeller et al. | 340/933 |
| 6,982,653 B2 * | 1/2006 | Voeller et al. | 340/933 |
| 7,042,346 B2 * | 5/2006 | Paulsen | 340/438 |
| 7,187,286 B2 * | 3/2007 | Morris et al. | 340/572.1 |
| 7,355,687 B2 * | 4/2008 | Voeller et al. | 356/139.09 |
| 7,404,427 B2 * | 7/2008 | Hillman et al. | 157/1 |
| 7,430,900 B2 * | 10/2008 | Belanger | 73/146 |
| 2002/0092346 A1 * | 7/2002 | Niekerk et al. | 73/146.2 |
| 2002/0092347 A1 * | 7/2002 | Niekerk et al. | 73/146.2 |
| 2002/0126005 A1 * | 9/2002 | Hardman et al. | 340/442 |
| 2003/0058118 A1 * | 3/2003 | Wilson | 340/679 |
| 2003/0080862 A1 * | 5/2003 | Kranz | 340/442 |
| 2003/0164759 A1 * | 9/2003 | Nantz et al. | 340/442 |
| 2003/0169149 A1 * | 9/2003 | Ohki et al. | 340/5.8 |
| 2004/0046027 A1 * | 3/2004 | Leone et al. | 235/462.13 |
| 2004/0066287 A1 * | 4/2004 | Breed et al. | 340/442 |
| 2004/0084517 A1 * | 5/2004 | Harm et al. | 235/375 |
| 2004/0124995 A1 * | 7/2004 | Treutler et al. | 340/870.07 |
| 2004/0134983 A1 * | 7/2004 | Oyama et al. | 235/385 |
| 2004/0164140 A1 * | 8/2004 | Voeller et al. | 235/375 |
| 2005/0035852 A1 * | 2/2005 | Paulsen | 340/438 |
| 2005/0073435 A1 * | 4/2005 | Voeller et al. | 340/933 |
| 2006/0042734 A1 * | 3/2006 | Turner et al. | 152/154.2 |
| 2006/0136782 A1 * | 6/2006 | Corniot | 714/26 |
| 2006/0176163 A1 * | 8/2006 | Choi et al. | 340/444 |
| 2006/0208859 A1 * | 9/2006 | Hougen et al. | 340/10.1 |
| 2006/0290505 A1 * | 12/2006 | Conwell et al. | 340/572.1 |
| 2007/0013502 A1 * | 1/2007 | Park et al. | 340/447 |
| 2007/0113635 A1 * | 5/2007 | Corniot | 73/146 |
| 2007/0237652 A1 * | 10/2007 | Belanger | 417/279 |
| 2007/0272423 A1 * | 11/2007 | Cutler et al. | 173/1 |
| 2008/0133081 A1 * | 6/2008 | Colarelli et al. | 701/34 |
| 2008/0284571 A1 * | 11/2008 | Wilbrink et al. | 340/10.1 |
| 2009/0072958 A1 * | 3/2009 | Hammerschmidt et al. | 340/447 |
| 2009/0091437 A1 * | 4/2009 | Corniot | 340/442 |
| 2009/0184815 A1 * | 7/2009 | Suzuki et al. | 340/447 |

* cited by examiner

METHOD AND DEVICE FOR TREATING A SET OF COMPONENTS FOR THE WHEEL OF A VEHICLE

CROSS-REFERENCE TO RELATED APPLICATIONS

This application is a continuation of International Application No. PCT/FR2004/000861, filed Apr. 7, 2004, which claims priority to French Patent Application 03/04739, filed Apr. 16, 2003, both of which are incorporated herein by reference.

BACKGROUND OF THE INVENTION

1. Field of the Invention

The present invention concerns a method for maintaining a set comprising at least two components in the group comprising a rim, a tire mountable on said rim and a safety support for at least partially supporting a tread of said tire under reduced or zero pressure conditions. The invention also concerns a device and machine for implementing the method.

2. Description of Related Art

Automatic tire mounting/removal machines are already known, making it possible to perform both operations of mounting a tire and possibly a safety support on a rim of an automobile wheel, and operations of removing the tire and possibly a safety support with respect to the wheel rim, with a view to the repair or replacement of the tire and possibly the safety support. Machines of this type are for example described in the documents EP 1 177 920 (counterpart U.S. Pat. No. 6,619,362 is incorporated herein by reference) and EP 1 253 026 (counterpart U.S. Pat. No. 6,854,950 is incorporated herein by reference).

In fact, the known machines of this type are not completely automatic. This is because, before each mounting or removal operation, the operator allocated to the machine must manually enter, for example by means of a keyboard, the information concerning the various components of the wheel or the wheel itself to be mounted or removed, in particular the information corresponding to the dimensions and type of the wheel, for example the inside diameter of the tire, the outside diameter, and the width B of the tire, the ratio H/B of the tire, the type of mounted assembly (conventional, PAX® or self supporting, often referred to as ZP, standing for "zero pressure"), or any other information vital to the adjustment of the machine and/or the maintenance that is to be carried out by the tire mounting/removal machine.

Such a manual entry of information by an operator takes a certain amount of time and, despite all the care given to the entering, this may be a source of error. In the event of error in entering, immobilisation of the mounting/removal machine and/or a longer immobilisation of the vehicle of the customer and/or physical damage to the wheel in the course of mounting or removal may result therefrom and/or, more seriously still, if a defect in mounting occurs and this is not detected before re-use of the wheel, serious accidents during the driving of the vehicle may occur.

The aim of the present invention is therefore to provide a method for effecting a maintenance, in particular, but not exclusively, an operation of mounting or removal of a tire on or from a wheel rim, said method being amenable to being implemented automatically, without it being necessary to manually enter the information essential for carrying out the desired maintenance, and therefore avoiding errors in entering and the harmful consequences thereof.

Moreover, automobile wheels are already known whose components, namely the rim, tire and any safety support comprise respective identification elements that can be verified automatically in order to allow, after mounting or assembly of the components on a vehicle wheel, checking of the components in order to verify that they are indeed compatible with each other and, in the case of incompatibility, to generate an appropriate alarm signal (see in this regard U.S. Pat. No. 6,717,512, which is incorporated herein by reference and which is a counterpart to PCT international patent application publication WO 02/09957).

Automobile wheels are already known, the wheel or tire of which is provided with a pressure monitoring system, comprising a pressure sensor and/or a pressure variation detector, as well as a management module configured to receive and process information supplied by the pressure sensor and/or pressure variation detector, and an emitting module for transmitting to a receiver independent of the wheel the information analysed and processed by the management module. In particular, the following PCT international patent application publications are noted in this regard: WO 02/34551 (counterpart U.S. Pat. No. 6,917,285 is incorporated herein by reference); WO 02/34552 (counterpart U.S. Patent Application Publication No. 2003/0234041 is incorporated herein by reference); and WO 03/34553 (counterpart U.S. Pat. No. 6,880,394 is incorporated herein by reference). According to circumstances, the information transmitted to the receiver is used to warn the driver of an automobile of an abnormality, such as for example insufficient pressure inside the tire cavity, a puncture, a rapid loss of pressure, or a burst, or to serve as parameters for a vehicle driving aid device, such as for example a device of the ESP type, a device of the brake anti-lock type (ABS) or a device of the anti-skid type.

However, none of the aforementioned documents teaches how to resolve the technical problem that is at the basis of the present invention, namely avoiding errors in entering and the harmful consequences thereof, in a method and machine for carrying out maintenance on a set comprising at least two components from the group comprising a rim, a tire mountable on said rim and a safety support intended to at least partially support a tread of said tire under reduced or zero pressure conditions.

SUMMARY OF THE INVENTION

To this end, the object of the present invention is a method comprising:

a) providing a set of components, at least one of said components of which is provided with an information medium that can be read automatically and is configured to supply, when it is read, at least one data item for use in carrying out a desired maintenance on said set;

b) bringing said set to a maintenance machine configured to carry out said desired maintenance on said set under the control of a programmable data management unit;

c) automatically reading the information medium of at least one of the components of said set brought to said maintenance machine and automatically transmitting said at least one data item to said programmable data management unit;

d) adjusting said maintenance machine on the basis of said at least one transmitted data item;

e) executing said desired maintenance for said set by means of said maintenance machine.

By virtue of the fact that, in the method of the invention, the data item or items essential for carrying out the adjustment of the maintenance machine are transmitted automatically and directly to the data management unit of the maintenance machine from the information medium or media carried respectively by the component or components of said set, there results from this a saving in time and in particular in the risks of faulty parameterising of the maintenance machine and the harmful consequences that could previously result therefrom, are avoided.

In a first embodiment of the method the invention, step b) includes bringing said set in an assembled state to a tire mounting/removal machine, and step e) includes performing a tire removal operation by means of said tire mounting/removal machine.

In a second embodiment of the method of the invention, step b) includes bringing the components of said set in a dismantled state to a tire mounting/removal machine, and step e) includes performing a tire mounting operation by means of said tire mounting/removal machine. The first and second embodiments can be implemented consecutively, for example during repair of a wheel that has suffered a puncture or during the replacement of a worn tire with a new tire.

In one or other of the first or second embodiments of the method, step c) includes transmitting, to said programmable data management unit, a plurality of data relating to the type and dimensions of each of the components of said set, and step d) includes adjusting the functional members of the tire mounting/removal machine on the basis of said plurality of data.

In this case, each component of said set can be provided with an automatically readable information medium configured to supply, when it is read, the data relating to the type and dimensions of the corresponding component of said set.

By way of variant, in one or other of the first and second embodiments of the method, step c) includes transmitting to said programmable data management unit at least one identification data item by way of said at least one data item, and step d) includes obtaining a plurality of data relating to the type and dimensions of each of the components of said set from said at least one identification data item transmitted and from a lookup table contained in a memory of said programmable data management unit, and adjusting the functional members of the tire mounting/removal machine on the basis of said plurality of data.

In this case, each component of said set can be provided with an automatically readable information medium configured to supply, when it is read, identification data relating to the corresponding component of said set.

When each component of said set is provided with an information medium configured to supply an identification data item or the data relating to the type and dimensions of the corresponding component, and if the desired maintenance includes performing a tire mounting operation by means of said mounting/removal machine, the method of the invention can also comprise, after step c) and before step d), steps comprising:

checking compatibility with each other of the components brought to the tire mounting/removal machine on the basis of the data transmitted to the programmable data management unit;

discerning any situation in which at least one of the components is not compatible with one or more other said components;

generating a suitable signal in the case of incompatibility.

In a third embodiment of the method of the invention, step b) includes bringing said set to a tire inflation machine and connecting said machine to an inflation valve carried by one of the components of said set, and step e) includes performing an inflation operation.

In this case, in step c), a data item for defining a set value for the tire inflation pressure is transmitted automatically to said programmable data management unit.

In this case, in step a), a set is used, one of said components of which comprises a pressure sensor in relationship, from the fluid point of view, with the tire cavity in said set in the assembled state, and in step c) the actual value of the pressure measured by the pressure sensor is also transmitted to said programmable data management unit.

In the first, second or third embodiment of the method, in step c) the reading of the information medium or media and the transmission of the data item or items between the information medium or media and the maintenance machine can take place by virtue of radio communication.

By way of variant, in step c), the reading of the information medium or media and the transmission of the data item or items between the information medium or media and the maintenance machine can take place by virtue of an optical reading.

Another object of the present invention is a device for maintaining a set comprising at least two components from the group comprising a rim, a tire mountable on said rim and a safety support intended to at least partially support a tread of said tire under reduced or zero pressure conditions, said device comprising:

a) at least one automatically readable information medium carried by one of said components of said set configured to supply, when it is read, at least one data item for use in performing a desired maintenance on said set;

b) at least one reading and transmission means configured to automatically read said information medium and to automatically transmit said at least one data item to a programmable data management unit;

c) said programmable data management unit;

d) a maintenance machine configured to perform said desired maintenance on said set under the control of said programmable data management unit.

In a first embodiment of the device, said maintenance machine is a tire mounting/removal machine.

In this case, said tire mounting/removal machine can also comprise an inflation appliance.

In a second embodiment of the device, said maintenance machine is an inflation machine.

In the case where the maintenance machine is designed to allow the inflation of tires, one of said components of said set carries a pressure sensor in relationship, from the fluid point of view, with the cavity of the tire in said set in the assembled state.

Each component of said set can be provided with an automatically readable information medium configured to supply, when it is read, data relating to the type and dimensions of the corresponding component of said set.

By way of variant, each component of said set can be provided with an automatically readable information medium configured to supply, when it is read, identification data relating to the corresponding component of said set.

In the latter case, the programmable data management unit contains a memory containing a lookup table comprising the identification data for all the components configured to be assembled in the same set and, for each identification data item, a plurality of data relating to the type and dimensions of the corresponding component.

Said information medium preferably comprises a label that can be read by one of the channels comprising the electronic (radio) channel and the optical channel.

In the first case, the reading and transmission means comprises a first radio emitter/receiver connected to the programmable data management unit and a second radio emitter/receiver included in said label.

In the second case, the reading and transmission means comprises an optical reader configured to read a code carried by said label.

Another object of the present invention is a machine for maintaining a set comprising at least two components from the group comprising a rim, a tire mountable on said rim and a safety support intended to at least partially support a tread of said tire under reduced or zero pressure conditions, at least one of said components carrying an automatically readable information medium configured to supply, when it is read, at least one data item for use in performing a desired maintenance on said set, said machine comprising:

a) at least one reading and transmission means configured to automatically read said information medium and to automatically transmit said at least one data item to a programmable data management unit;

b) a third programmable data management unit;

c) functional members configured to perform said desired maintenance on said set under the control of said programmable data management unit on the basis of said at least one data item transmitted.

In a first embodiment of the machine, said functional members are configured to perform tire mounting/removal operations.

The machine can also comprise an inflation appliance.

In a second embodiment of the invention, said functional members are configured to perform tire inflation operations.

In one or other of the first or second embodiments of the machine, the programmable data management unit can comprise a memory containing a lookup table comprising identification data for all the components configured to be assembled in the same set and, for each identification data item, a plurality of data relating to the type and dimensions of the corresponding component.

In one or other embodiment of the machine, said reading and transmission means can comprise, on the machine side, a radio emitter/receiver connected to the programmable data management unit.

By way of variant, said reading and transmission means can comprise, on the machine side, an optical reader configured to read a code carried by a label constituting said information medium.

BRIEF DESCRIPTION OF THE DRAWINGS

Other characteristics and advantages of the invention will emerge during the following description of a few embodiments of the invention given by way of examples with reference to the accompanying drawings, in which.

DESCRIPTION OF PREFERRED EMBODIMENTS

Figure 1:
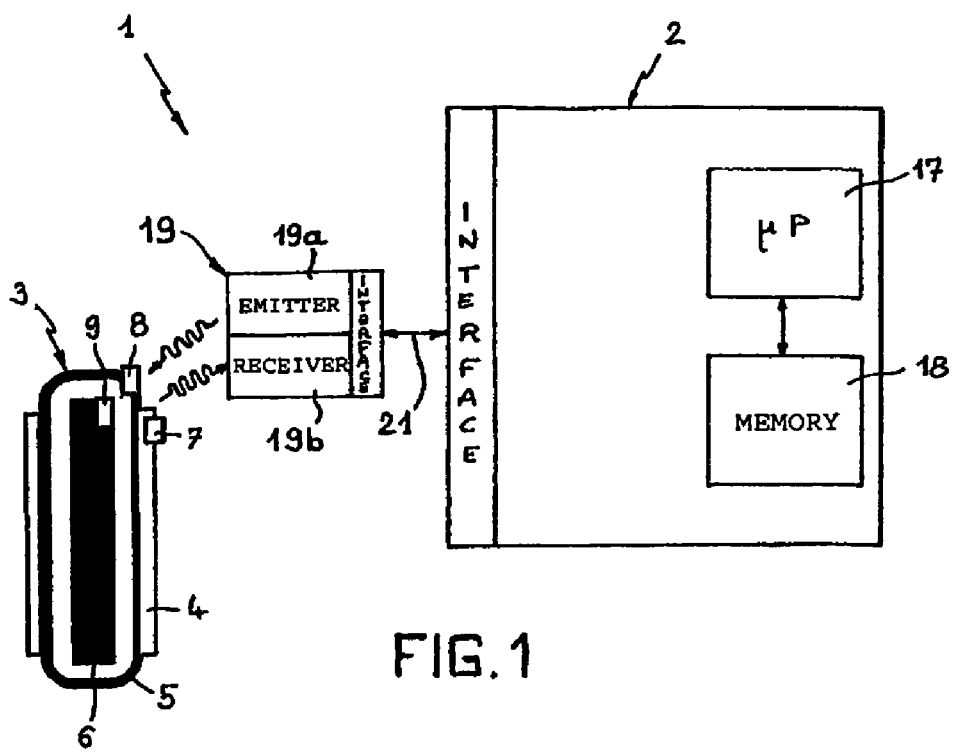
FIG. 1 illustrates a schematic representation of a maintenance device according to a first embodiment of the invention.

Referring first of all to FIG. 1, a maintenance device 1 is shown for implementing the method of the invention. The maintenance device 1 comprises a maintenance machine 2, for example an automatic tire mounting/removal machine configured to perform a required maintenance on a multicomponent set 3, for example an automobile wheel, comprising a rim 4, a tire 5 and possibly a safety support 6 intended to allow a temporary running of a vehicle equipped with such a wheel when there is a partial or total pressure drop within the cavity of the tire 5 of said wheel.

Figure 2:
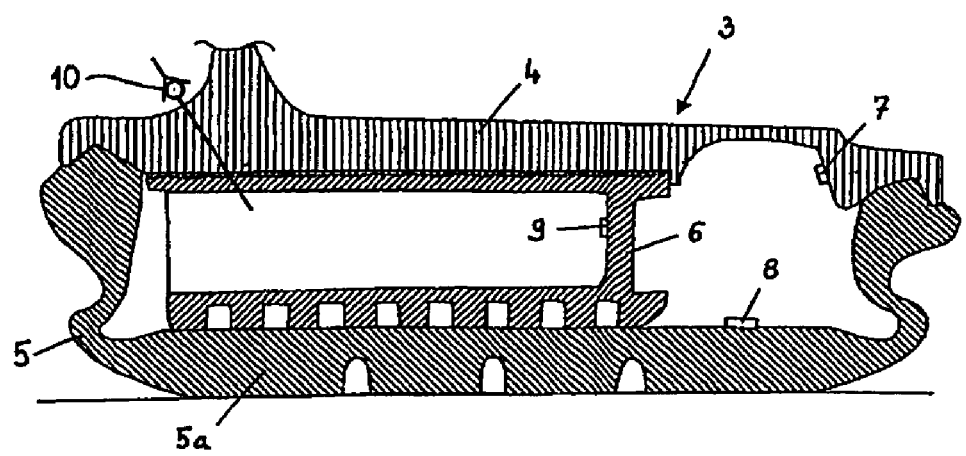
FIG. 2 is a view in transverse section of a mounted set, the components of which are provided with information media.

FIG. 2 illustrates, in transverse section, a mounted set of wheels 3 of a known type, in a flat running state, that is to say in a deflated state of the tire 5.

In the maintenance device according to this first embodiment of the invention, each of the components 4, 5 and 6 of the wheel 3 comprises, in a manner known per se, an information medium 7, 8 or 9, respectively. However, here, each information medium 7, 8 or 9 carries or contains at least one data item that can be used for carrying out a desired maintenance on the wheel 3, in particular data essential for carrying out a prior adjustment of the mounting/removal machine 2 before a removal operation or an operation of mounting on the wheel 3.

FIG. 2 shows a known example of the implantation of the information media 7, 8 and 9 in a wheel 3. In the example shown in FIG. 2, the information media 7, 8 and 9 are disposed against a wall of the corresponding component and held for example by adhesive bonding. For example, the information medium 8 associated with the tire 5 is disposed against the internal face of the tread 5a of the tire 5 and fixed to the tread by adhesive bonding. According to another example (not shown), the information media 7, 8 and 9 can be integrated or embedded, in a known fashion, in one or other of the walls of the corresponding component 4, 5 or 6. FIG. 2 also shows, highly schematically, an inflation valve 10 in fluid communication with the internal cavity of the tire 5.

The information media 7, 8 and 9 can take a multiplicity of forms, such as for example an electronic label such as a transponder, a memory element of the ROM or RAM type, etc.

Figure 3:
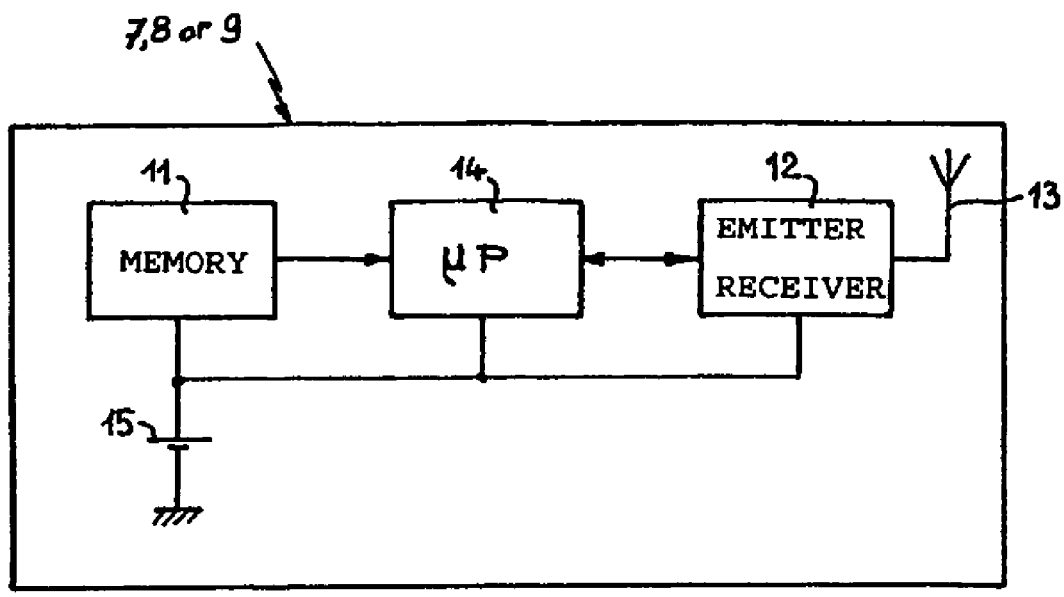
FIG. 3 illustrates a schematic representation of an information medium that can be used with any one of the components of the set shown in FIG. 2 and can be used with the maintenance device depicted in FIG. 1.

FIG. 3 shows, schematically, an example of an electronic label configured to be used to form the information medium 7, 8 or 9. As shown in FIG. 3, the electronic label comprises a memory 11 containing the data item or items to be transmitted to the mounting/removal machine 2, an emitter/receiver 12 configured to establish, via an antenna 13, bi-directional wireless communication with said mounting/removal machine 2, and a microprocessor 14 configured to manage the functioning of the memory 11 and of the emitting section of the emitter/receiver 12 when the receiving section thereof receives an interrogation or stimulation signal coming from the mounting/removal machine 2. A cell or battery 5 can be provided for supplying the electrical energy necessary for the functioning of the memory 11, of the emitter/receiver 12 and of the microprocessor 14. However, the presence of the battery 15 is not absolutely necessary when a simple transponder and a fixed memory containing a unique code are used since in this case the energy necessary for the functioning of the electronic label can be taken from the interrogation or stimulation signal received by the electronic label coming from the mounting/removal machine.

Figure 4:
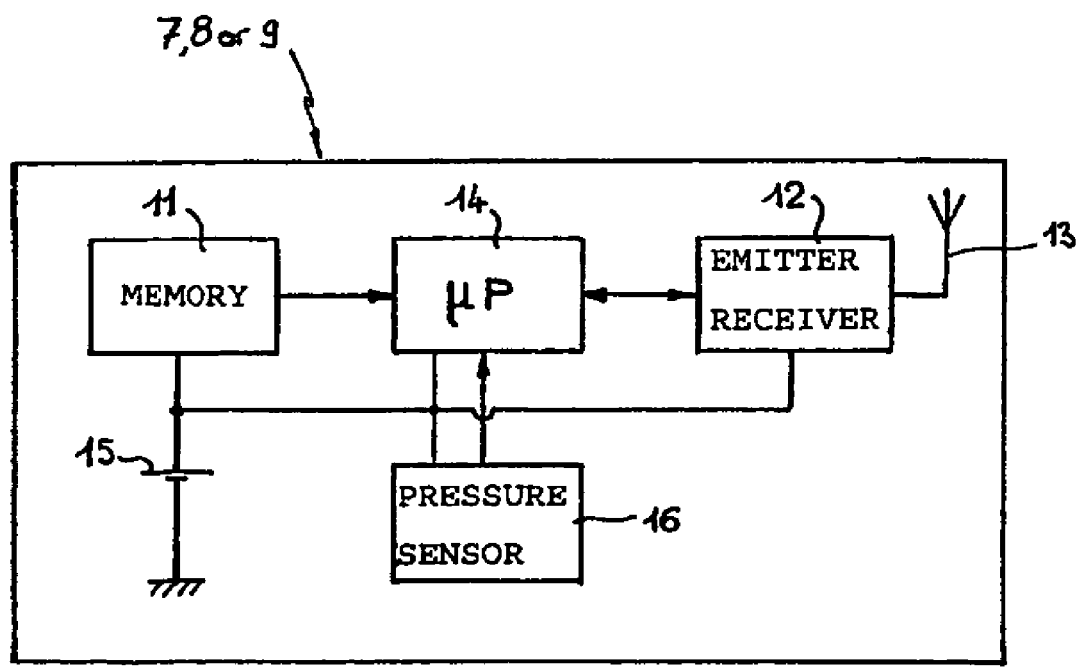
FIG. 4 is a view similar to FIG. 3, schematically illustrating a sophisticated information medium.

FIG. 4 shows, schematically, a more sophisticated electronic label than the one in FIG. 3, which can also be used to form one or other of the information media 7, 8 or 9, in the case where the electronic label must also be capable of providing an indication of the value of the pressure inside the cavity of the tire 5 on the wheel 3. In the electronic label in FIG. 4, the elements that are identical or that fulfil the same role as those of the electronic label in FIG. 3 are designated by the same reference numbers and will not be described again in detail. The electronic label in FIG. 4 differs from the one in FIG. 3 in that it also comprises a pressure sensor 16 configured to measure the pressure in the cavity of the tire 5. In a known fashion, use is preferably made, as a pressure sensor 16, of a sensor not requiring any power supply, such as for example a sensor of the piezoelectric type, in order to save on the energy in the cell or battery 15. This makes it possible to increase the life of the cell or battery 15 so that it can correspond, as far as possible, to that of the tire 5 on the wheel 3 or of the vehicle equipped with said wheel. Thus, in addition to its function of information medium for implementing the method of the invention, the electronic label can also advantageously be used in the case where the wheel or vehicle is equipped with a system for monitoring the tire pressure both when stopped and during running.

The automatic mounting/removal machine 2 comprises several functional members, such as for example a rotating plate provided with members for gripping, centering, clamping and/or locking the rim of the tire, a wheel, rim or tire loader configured to load a complete wheel or a wheel rim on the said rotating plate depending on whether it is a case of performing a removal operation or a mounting operation, at least one movable arm provided with a tool-holder head at its free end, a tire removal tool attached to said tool-holder head, a tire mounting tool that is attached also to said tool-holder head and is attached to another tool-holder head on another movable arm, etc. All the functional members can take various well-known forms and have therefore not been shown in FIG. 1 since they are not essential for an understanding of the invention. For more details, it is possible to refer to the many documents in the literature describing machines of this type, for example the documents EP 1 177 920 (mentioned above) and EP 1 157 860 (counterpart U.S. Pat. No. 6,527,032 is incorporated herein by reference), or the document EP 1 253 026 (mentioned above), which describes a wheel-loader for this type of machine.

Returning to FIG. 1, it can be seen that the automatic tire mounting/removal machine comprises, in a known fashion, a programmable data management unit 17, for example a microprocessor, and a memory 18, which may be an internal memory of the microprocessor 17 or an external memory connected to the microprocessor. The microprocessor 17 is designed, in a known fashion, to adjust the various functional members of the machine 2 before each operation of mounting or removing a tire on the basis of data introduced into the memory 18 and that relate to the type and dimensions of a vehicle wheel or components of a vehicle wheel on which tire removal and/or mounting operations are to be performed, for example in order to repair a punctured tire or to replace a worn or burst tire with a new tire and, possibly also, to replace a damaged safety support with a new safety support. The microprocessor 17 is also designed, in a known fashion, to then manage the functioning of the functional members of the machine during the removal and/or mounting operations proper, on the basis of a program stored in the memory 18.

Conventionally, as indicated in the Background section, the data essential to the prior adjustment of the functional members of the machine 2, with a view to adapting it to each set that is to be mounted or removed, are entered manually by an operator allocated to the machine 2 by means of a keyboard, and then stored in the memory 18.

In the maintenance device 1 according to the invention, the automatic tire mounting/removal machine comprises, in place of the above mentioned keyboard or in addition to it, at least one emitter/receiver 19 connected to the microprocessor 17 by an appropriate link 21, for example a serial link of the RS-232 type or a link of the NAC type or other local network. The emitter/receiver 19 is designed to establish a bi-directional wireless communication with the emitter/receiver 12 of the electronic label 7, 8 or 9 in FIG. 3 or 4. For example, the emitting section 19a of the emitter/receiver 19 can be designed to emit an interrogation or stimulation signal at a frequency of 125 kHz for a period of 2 to 3 seconds whenever a wheel 3 or a component of the wheel 3 is loaded into the machine 2. For example, when the machine 2 is equipped with an automatic loader, the emitter/receiver 19 can be installed on the automatic loader and the latter can also comprise a suitable switch, for example an electromechanical switch or an optoelectronic switch, a proximity detector or any other sensor sensitive to the presence of a wheel or wheel component on the loader and configured to produce a useful signal for triggering the emission of said interrogation or stimulation signal by the emitting section 19a of the emitter/receiver 19 whenever said switch, detector or other sensor is activated by a wheel 3 or a component of the wheel 3 placed on the loader.

When the receiving section of the emitter/receiver 12 of the electronic label 7, 8 or 9 receives the interrogation or stimulation signal emitted by the emitter/receiver 19, it excites the microprocessor 14, which seeks the data item or items contained in the memory 11 and transmits said data, via the emitting section of the emitter/receiver 12, to the receiving section 19b of the emitter/receiver 19, for example in the form of a signal coded at a frequency of 433 MHz.

Where each of the components 4, 5 and 6 of the wheel 3 comprises an information medium 7, 8 or 9 such as the electronic label depicted in FIG. 3, the memory 11 of each electronic label can contain one or more data items relating to the type and dimensions of the corresponding component 4, 5, 6. In this case, the coded response signal sent by the emitting section of the emitter/receiver 12 of each electronic label 7, 8 or 9 will contain a single code or frame of codes depending on whether the memory 11 contains only one or several data items.

By way of variant, the memory 11 of each electronic label 7, 8 or 9 can contain an identification data item configured to identify the corresponding component 4, 5 or 6. In this case, the coded response signal sent by the emitting section of the emitter/receiver 12 of each electronic label 7, 8 or 9 contains only one code.

In all cases, the coded response signal can be set to a particular frequency, around 433 MHz, but differently for each label, and the emitter/receiver 19, on the machine 2 side, comprises a broad-band receiving section 19b able to receive all the frequencies emitted by the electronic labels 7, 8 and 9.

In addition, the interrogation or stimulation signal emitted by the emitting section of the emitter/receiver 19 and the coded response signal sent by the emitting section of the emitter/receiver 12 of each electronic label 7, 8 or 9 are synchronised; that is to say the coded response signals are emitted in a time window with a predefined duration after the emission of the interrogation or stimulation signal.

Thus the microprocessor 17 of the machine 2 is capable of rejecting any stray signal not received in the time window.

The coded response signals received by the emitter/receiver 19 and transmitted to the microprocessor 17 of the machine 2 are stored in the memory 18.

In the case where each of the coded response signals sent by the electronic labels 7, 8 and 9 contains only one code identifying the corresponding component 4, 5 or 6, the memory 18 associated with the microprocessor 17 or included in it must contain a lookup table containing the identification data for all the components configured to be assembled in the same set, and, for each identification data item, a plurality of data relating to the type and dimensions of the corresponding component. Thus, if at a given moment the operation to be performed by the machine 2 is an operation of mounting a tire on a rim, the microprocessor 17 is in a position to verify whether the components loaded into the machine are compatible with it and, in the event of incompatibility, it can cause the emission of a suitable error message on a display and/or the emission of an appropriate alarm signal, for example an audible signal and/or a light signal.

When the microprocessor 17 detects no abnormality or incompatibility, it can then control the adjustments of the machine 2 on the basis of the data relating to the type and dimensions of the components, data which have either been transmitted automatically by the electronic labels 7, 8 and 9 to the machine 2 or found by the microprocessor 17 in the memory 18 by means of the received identification data for the components and by means of the lookup table contained in said memory. The adjustment operations and the tire mounting or removal operations can then be controlled by the microprocessor 17 and executed as in a conventional automatic tire mounting/removal machine.

For example, for an operation of removing a wheel 3 equipped with a conventional tire 5, the pressure rollers and extractor lever (mounting/removal tools) are first of all brought at a distance from the centre of the rotating plate of the machine 2 greater than the outside diameter of the tire 5 in order to allow the placing and fixing of the wheel 3 on said rotating plate. Next, after the fixing of the wheel 3 on the rotating plate, the pressure rollers are separated vertically from each other, if necessary, so that the space in between the rollers is a little greater than the width of the tire 5, and then the rollers and extractor lever are brought to a distance from the centre of the rotating plate corresponding to the inside diameter of the tire bead. After this, the removal operation proper can commence.

It is important for the machine 2 to be able to determine the type of tire (for example: conventional or PAX) on the wheel that is placed on the machine, since the tools used and the sequence of operations are not the same in all cases. By virtue of the invention, the machine 2 can be given information automatically on the type of tire equipping the wheel installed on the rotating plate of the machine. If the machine is designed to deal with several types of tire, it will then automatically choose the appropriate tools for dealing with the tire installed on the rotating plate, or in a less sophisticated version it will request the operator to mount the appropriate tools on the tool-holder head or heads of the machine. If the machine is designed to automatically deal with only one type of tire, by virtue of the knowledge of the type of tire on the wheel installed on the machine, it will then be able to detect whether it is capable of dealing with the said wheel and, according to circumstances, to make the necessary adjustments and then to carry out the desired maintenance, or to refuse to carry out the maintenance by for example producing an alarm signal or displaying an error message indicating that the wheel installed on the machine can not be dealt with.

Figure 5:
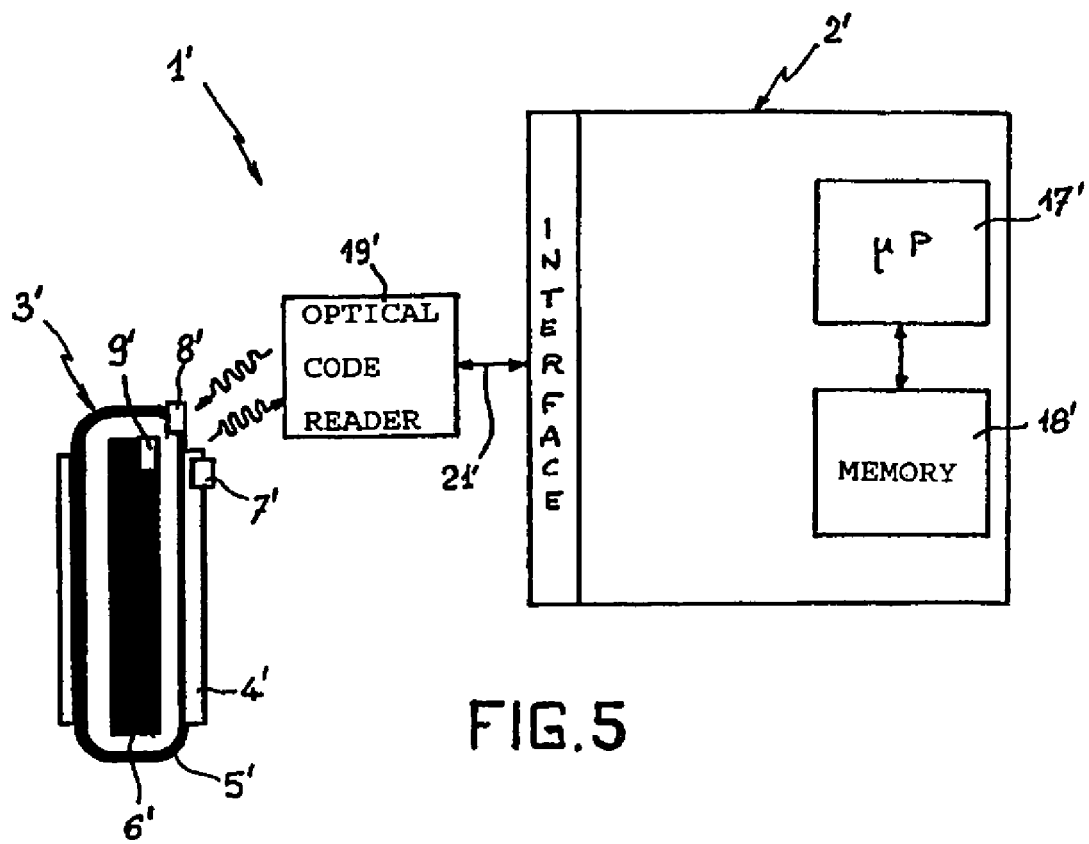
FIG. 5 illustrates a schematic representation of a maintenance device according to a variant embodiment of the invention.
Figure 6:
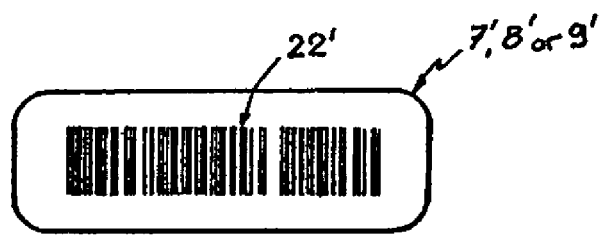
FIG. 6 illustrates a schematic representation of an information medium that can be used for any one of the components of the set shown in FIG. 2 and can be used with the maintenance device depicted in FIG. 5.

FIG. 5 illustrates a schematic representation of a variant embodiment of an automatic tire mounting/removal machine. In FIG. 5, the elements that are identical or fulfil the same role as those of the embodiment in FIG. 1 are designated by the same reference numbers allocated the sign "'" and will not be described again in detail. The machine 2' in FIG. 5 differs from the machine 2 in FIG. 1 in that the emitter/receiver 19 is here replaced by an optical reader 19'. In this case, each of the information media 7', 8' and 9' carried selectively by the rim 4', the tire 5' and any safety support 6' includes a label carrying an appropriate code, configured to be read optically, for example of the bar code 22' type as shown in FIG. 6.

Naturally, in this variant embodiment, the labels 7', 8' and 9' must be glued, printed or otherwise fashioned on an external face of the corresponding component 4', 5' or 6', so as to be easily read by the optical reader 19'.

Preferably, the code 22' carried by each label 7', 8' or 9' is a code identifying the corresponding component 4', 5' or 6', and the memory 18' associated with the microprocessor 17' or included in it contains a lookup table, in a similar fashion to the case described above where the memory 11 of the electronic label 7, 8 or 9 contains identification data.

There too, the data or codes read on the labels 7', 8' or 9' by the optical reader 19' are transmitted, without entry error, to the microprocessor 17', which can then, on the basis of the data or codes received by it, control the appropriate adjustments to the machine 2' in order to adapt it to the components 4', 5' and 6' of the wheel 3' brought to said machine.

Figure 7:
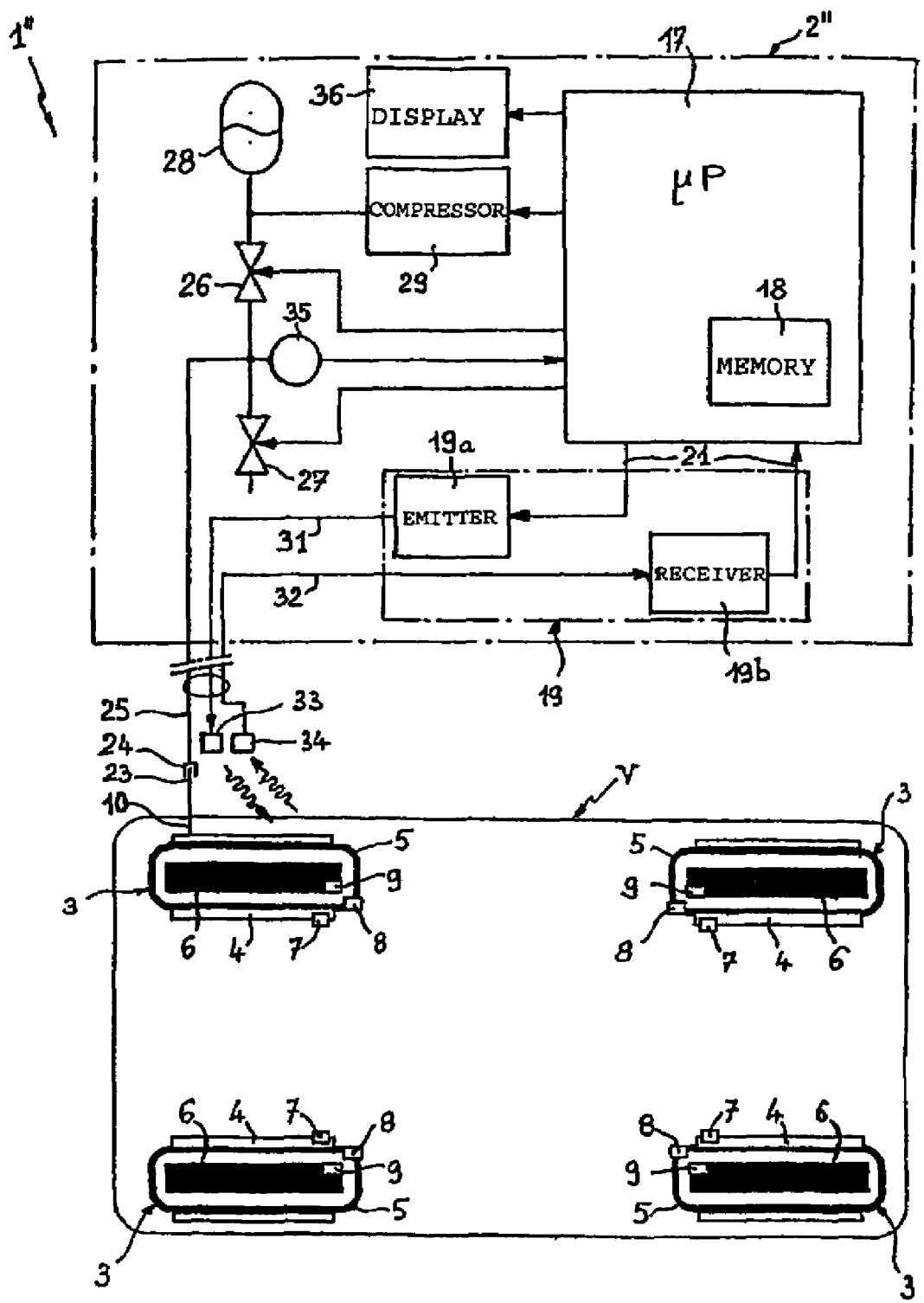
FIG. 7 illustrates a schematic representation of a maintenance device according to a second embodiment of the invention.

FIG. 7 illustrates a schematic representation of a second embodiment of a processing device 1" that here uses a tire inflation machine 2". In FIG. 7, the elements that are identical or that fulfil the same role as those of the embodiment in FIG. 1 are designated by the same reference numbers and will not be described again in detail.

FIG. 7 also schematically depicts a vehicle V with its four wheels 3, each wheel 3 having for example a structure like the one partially shown in section in FIG. 2. One of the wheels 3 of the vehicle V is shown with a valve 10 exaggeratedly elongated for the convenience of the drawing, said valve 10 comprising a male coupling 23 connected to a female coupling 24 at one end of a flexible compressed air supply hose 25 coming from the inflation machine 2".

In the inflation machine 2", the other end of the flexible hose 25 is connected firstly to the outlet of an inflation solenoid valve 26 and secondly to the inlet of a deflation solenoid valve 27 whose outlet is to atmosphere. The inlet of the inflation solenoid valve 26 is itself connected firstly to a pressure accumulator 28 and secondly to the outlet of a compressor of a powered compressor unit 29. With the pressure accumulator 28 there can be associated a pressure sensor (not shown) whose output signal is sent to the microprocessor 17. In this case, a program contained in the memory 18 of the microprocessor 17 can be provided for comparing the value of the pressure in the pressure accumulator 28, measured by the above mentioned pressure sensor, with two threshold values, respectively lower and upper, in order to start up the powered compressor unit 29 when the measured value of the pressure falls below the threshold value, and to stop the powered compressor unit 29 when the measured value of the pressure reaches the upper threshold value.

By way of a variant, in place of the above mentioned pressure sensor, it is possible to associate, with the pressure accumulator 28, a pressure switch with two pressure thresholds that starts up the powered compressor unit when the pressure in the pressure accumulator 28 falls below a lower threshold value and stops said power compressor unit when the pressure in the accumulator 28 reaches an upper threshold value.

As in the embodiment in FIG. 1, the inflation machine 2" comprises an emitter/receiver 29 configured to send an interrogation or stimulation signal to the information media 4, 5 and 6 of the wheel 3 of the vehicle V whose valve 10 is connected to the flexible hose 25 and to receive the coded signal sent by the information media 4, 5 and 6, which includes, for example, electronic labels similar to those shown in FIG. 3 or in FIG. 4.

However, in this case, the memory 11 of the electronic label associated with the rim 4 or tire 5 contains, in place of or in addition to the data relating to the type and dimensions of the corresponding component 4 or 5, data for defining a set value for the inflation pressure of the tire 5 on the corresponding wheel 3. Where the memory 18 contains a lookup table, it is not absolutely essential for the memory 11 of the electronic label 7 or 8 associated with the rim 4 or with the tire 5 to contain a set value for the inflation pressure of the corresponding tire. This is because, in this case, it suffices for the memory 11 to contain identification data and for the lookup table contained in the memory 18 to comprise, for each identification data item, a set value or a data item for defining a set value for the inflation pressure of the tire 5 associated with the rim 4 which were identified by means of the identification data contained in the memory 11 of the electronic labels 7 and 8.

The emitting section 19a and the receiving section 19b of the emitter/receiver 19 of the inflation machine 2" are preferably respectively connected by flexible cables 31 and 32 to antennae 33 and 34 situated close to the female coupling 24 of the flexible hose 25. The cables 31 and 32 can be connected to or integrated in the flexible hose 25, at least in its part situated outside the inflation machine 2" in order to form only one flexible elongate element with said hose. Under these conditions, using emitters/receivers 12 and 19 with short range, for example less than one meter, it can be ensured that the emitter/receiver 19 of the inflation machine 2" will receive solely the data item or items contained in the electronic labels 7, 8 and 9 of the components 4, 5 and 6 of the wheel 3 whose valve 10 is connected to the flexible hose 25.

The inflation machine 2" can also comprise a pressure sensor 35 connected, from the fluid point of view, to the flexible hose 25 and electrically connected to the microprocessor 17. When the flexible hose 25 is connected to the valve 10 of the wheel 3, the pressure sensor measures the actual value of the pressure in the internal cavity of the tire 5 of the wheel 3 and supplies to the microprocessor 17 a signal indicating said actual value of the pressure. A display 36 is also preferably connected to the microprocessor 17, for example in order to display the actual value of the pressure measured by the pressure sensor 35 or by the pressure sensor 16 (FIG. 4) if the electronic label 7 or 8 associated with the rim 4 or with the tire 5 on the wheel 3 whose valve 10 is connected to the flexible hose 25 comprises such a pressure sensor.

An inflation cycle can be initiated in various ways. For example, the program contained in the memory 18 of the microprocessor 17 can be designed so that, when the machine 2" is on standby, the microprocessor 17 excites the emitter/receiver 19 at regular intervals, for example every 10 seconds, so that its emitting section 19a emits an interrogation or stimulation signal for two to three seconds. If at this moment the flexible hose 25 has already been connected to a valve 10 of a wheel 3 and the receiving section 19b of the emitter/receiver 19 receives a coded response signal coming from the electronic labels 7, 8 and 9 of the wheel 3 in a time window of predefined duration following the emission of the interrogation or stimulation signal, an inflation cycle is initiated.

By way of variant, the emitting section 19a of the emitter/receiver 19 could be arranged to emit the interrogation or stimulation signal to the electronic labels 7, 8 and 9 only in response to the reception by the microprocessor 17 of a signal indicating pressure generated by the pressure sensor 35 when the flexible hose 25 is connected to the valve 10 or, if the tire 5 is completely deflated, in response to the pressing of a start push button (not shown) by a user of the inflation machine 2".

In all cases, the initiation of an inflation operation commences with an operation of adjusting the inflation machine 2". This adjustment operation includes loading into the memory 18 or into another working memory a set value for the inflation of the tire 5 of the wheel whose valve 10 is connected to the flexible hose 25. As indicated previously, this set value can be obtained directly and automatically from the memory 11 of the electronic label 7 or 8 or can be obtained from a lookup table contained in the memory 18 on the basis of the identification data sent to the microprocessor 17 by the electronic label 7 or 8. In an even more sophisticated version, the set value could be calculated by the microprocessor 17 from one or other of the above data items and from supplementary data such as for example the temperature of the tire 5 to be inflated (the value of this temperature being supplied, for example, by a temperature sensor integrated in the electronic label 8 associated with the tire 5 and transmitted to the microprocessor 17 by the emitter/receiver 12 conjointly with the data contained in the memory 11 of this label), information indicating that it is a case of a front wheel or a rear wheel (this information can be supplied by transponders fixed to appropriate points on the vehicle V and able to react to the interrogation or stimulation signal emitted by the emitting section 19a of the emitter/receiver 19), information indicating whether the vehicle is lightly loaded, moderately loaded or highly loaded, or yet other information.

Once the set value for the inflation pressure of the wheel 3 has been stored in a suitable memory of the microprocessor 17, the program then launches the inflation operation proper.

The microprocessor 17, commences by checking whether the actual value of the pressure in the cavity of the tire 5, measured by the pressure sensor 35 or 16, is less than the set value or is greater than set value. If the tire 5 is underinflated the microprocessor 17 then, by means of a power control circuit (not shown), causes the opening of the solenoid valve 26 in order to inflate the tire 5. The inflation operation continues until the actual value of the pressure measured by the pressure sensor 35 or 16 reaches the set value. At this moment, the microprocessor 17 causes the closure of the solenoid valve 26 and the emission of an audible and/or light signal warning the user of the inflation machine 2" that the operation of inflating the tire 5 is terminated.

Conversely, if the tire 5 is excessively inflated, the microprocessor 17 then, by means of another power control circuit (not shown), commands the opening of the solenoid valve 27 in order to deflate the tire 5. The deflation operation continues until the actual value of the pressure measured by the pressure sensor 35 or 16 reaches the set value. At this moment, the microprocessor causes the closure of the solenoid valve 27 and the emission of the audible and/or light signal warning the user that the inflation operation is terminated.

Naturally the embodiments of the invention described above have been given by way of purely indicative and in no way limiting examples and many modifications can easily be made by a person skilled in the art without for all that departing from the scope of the invention.

For example, the location of the emitter/receiver 19 or of the optical reader 19' is not limited to the location indicated above in the description since it can be disposed at various other points on the automatic tire mounting/removal machine 2 or 2'. Likewise, it is also possible to provide a plurality of emitters/receivers 19 disposed respectively in different places on the machine 2 or 2', for example each alongside a functional member of the machine having to be adjusted prior to each removal and/or mounting operation according to the type and/or dimensions of the wheel components. Each emitter/receiver 19 or each optical reader 19' can be designed to transmit to the microprocessor 17 or 17' all the data contained in the information media 7, 8 and 9 or 7', 8' and 9'. By way of variant, each emitter/receiver 19 or each optical reader 19' can be designed to transmit to the microprocessor 17 only particular specific data for adjusting the functional member or members situated in the immediate vicinity of the emitter/receiver 19 or optical reader 19' concerned.

In the case where an optical reader is used, such as the optical reader 19', by way of reading and transmission means, it is not essential for this to be installed at a fixed point on the machine. Instead of this, it is of course possible to use an optical reader connected by a flexible cable to the machine 2" so as to be able to be manipulated by an operator, for example in order to be brought each time in contact with or in the immediate vicinity of a label carried by one of the components 4, 5 and 6 of the wheel 3.

In addition, although the inflation machine 2" was described above as an individual machine, that is to say as a machine able to be used as an inflation station, obviously the inflation machine could be associated or combined with an automatic tire mounting/removal machine such as the machine 2 in FIG. 1, the microprocessor 17, the memory 18 and the emitter/receiver 19 being able to be common to the two machines.

What is claimed is:

1. A method for maintaining a set that contains at least two components from a group that includes: a rim, a tire mountable on said rim, and a safety support intended to at least partially support a tread of said tire under reduced or zero pressure conditions, said method comprising steps of:
    a) providing a set of components, at least one of said components carrying an information medium that can be read automatically by a machine and that supplies, when said information medium is read, at least one data item for use in carrying out a desired maintenance on said set;
    b) bringing said set to a maintenance machine configured to carry out said desired maintenance on said set under control of a programmable data management unit;
    c) utilizing a reader of said maintenance machine to automatically read said information medium of said at least one of said components of said set brought to said maintenance machine, and transmitting said at least one data item read from said information medium to said programmable data management unit, wherein said at least one data item includes sensor data from a sensor on a component of said at least one of said components, said sensor data providing a current condition of said component;
    d) determining, by said programmable data management unit, whether said at least one of said components of said set is compatible with one or more other components of said set, based on said at least one data item read from said information medium; and
    e) if said at least one of said components of said set is compatible with said one or more other components of said set, adjusting said maintenance machine based on said at least one transmitted data item, and executing said desired maintenance for said set using said maintenance machine.

2. The method according to claim 1, wherein said step b) includes bringing said set in an assembled state to a tire mounting/removal machine, and said step e) includes performing an operation of removing said tire using said tire mounting/removal machine.

3. The method according to claim 1, wherein said step b) includes bringing said components of said set in a dismantled state to a tire mounting/removal machine, and said step e) includes performing a tire mounting operation using said tire mounting/removal machine.

4. The method according to claim 1, wherein said step c) includes transmitting to said programmable data management unit a plurality of data relating to a type and dimensions of each of said components of said set, and said step d) includes adjusting said functional members of a tire mounting/removal machine based on said plurality of data.

5. The method according to claim 4, wherein each component of said set is provided with an information medium that can be read automatically by said maintenance machine, and wherein each information medium is configured to supply, when that information medium is read, data relating to a type and dimensions of a corresponding component of said set.

6. The method according to claim 1, wherein said step c) includes transmitting to said programmable data management unit at least one item of identification data by way of said at least one data item, and said step d) includes obtaining a plurality of data relating to a type and dimensions of each of said components of said set from said at least one item of identification data transmitted to said programmable data management unit and from a lookup table contained in a memory of said programmable data management unit, and adjusting functional members of a tire mounting/removal machine based on said plurality of data.

7. The method according to claim 6, wherein each component of said set is provided with an information medium that can be read automatically by said maintenance machine, and wherein each information medium is configured to supply, when when that information medium is read, identification data relating to a corresponding component of said set.

8. The method according to claim 5 or 7, further comprising steps of:
    checking compatibility between said components brought to said tire mounting/removal machine based on said data transmitted to said programmable data management unit;
    discerning an incompatibility situation in which at least one of said components is not compatible with said one or more other components of said set; and
    generating a suitable signal when said incompatibility situation is discerned in said discerning step.

9. The method according to claim 1,
    wherein said step b) includes bringing said set to a tire inflation machine and connecting said tire inflation machine to an inflation valve carried by a tire of said set, and said step e) includes performing an inflation operation, and
    wherein said sensor data includes pressure data of said tire when stopped and pressure data of said tire while running.

10. The method according to claim 9, wherein, in said step c), a data item for defining a set value for an inflation pressure of said tire is automatically transmitted to said programmable data management unit.

11. The method according to claim 10, wherein one of said components of said set includes a pressure sensor in relationship, from a fluid point of view, with a cavity of said tire in said set in an assembled state, and, in said step c), an actual value of pressure measured by said pressure sensor is also transmitted to said programmable data management unit.

12. The method according to claim 1, wherein, in said step c), said information medium is read via a radio communication, and said at least one data item is transmitted via a radio communication.

13. The method according to claim 1, wherein, in said step c), said information medium is read optically, and said at least one data item is transmitted optically.

14. A maintenance system for maintaining a set of components that contains at least two components from a group that includes: a rim, a tire mountable on said rim, and a safety support for at least partially supporting a tread on said tire under reduced or zero pressure conditions, said system comprising:
   a reader for automatically reading an information medium, carried by a component of said set, and obtaining at least one data item for use in performing a required maintenance on said set;
   a programmable data management unit; and
   a transmitter for automatically transmitting said at least one data item read from said information medium to said programmable data management unit,
   wherein said programmable data management unit determines whether said at least one of said components of said set is compatible with one or more other components of said set, based on said at least one data item read from said information medium, and, if said at least one of said components of said set is compatible with said one or more other components of said set, said programmable data management unit controls a maintenance machine to perform said required maintenance, and
   wherein said at least one data item includes sensor data from a sensor on said component of said set, said sensor data providing a current condition of said component.

15. The system according to claim 14,
   wherein said maintenance machine is a tire mounting/removal machine, and
   wherein said sensor data includes pressure data of a tire when stopped and pressure data of said tire while running.

16. The system according to claim 15, wherein said tire mounting/removal machine includes an inflation appliance.

17. The system according to claim 14, wherein said maintenance machine is an inflation machine.

18. The system according to claim 16, wherein one of said components of said set includes a pressure sensor in relationship, from a fluid point of view, with a cavity of a tire in said set in an assembled state.

19. The system according to any one of claims 14 to 18, wherein each component of said set is provided with an information medium that can be read automatically by said reader, and wherein each information medium is configured to supply, when that information medium is read, data relating to a type and dimensions of a corresponding component of said set.

20. The system according to any one of claims 14 to 18, wherein each component of said set is provided with an information medium that can be read automatically by said reader, and wherein each information medium is configured to supply, when that information medium is read, an item of identification data relating to a corresponding component of said set.

21. The system according to claim 20, wherein said programmable data management unit includes a memory containing a lookup table with identification data for all components to be assembled in a same set, and, for each item of identification data, a plurality of data relating to a type and dimensions of a corresponding component.

22. The system according to claim 14, wherein said information medium includes a label that can be read by one of: a radio channel and an optical channel.

23. The system according to claim 22, wherein said transmitter includes a first radio emitter/receiver connected to said programmable data management unit and a second radio emitter/receiver included in said label.

24. The system according to claim 22, wherein said reader includes an optical reader configured to read a code carried by said label.

25. A maintenance machine for maintaining a set that contains at least two components from a group that includes: a rim, a tire mountable on said rim, and a safety support intended to at least partially support a tread on said tire under reduced or zero pressure conditions, at least one of said components carrying a machine readable information medium configured to provide at least one data item for use in performing a required maintenance on said set, said machine comprising:
   a) a reader configured to automatically read said information medium to obtain said at least one data item;
   b) a programmable data management unit;
   c) a transmitter for automatically transmitting said at least one data item read from said information medium to said programmable data management unit; and
   d) functional members configured to perform said required maintenance on said set under control of said programmable data management unit, based on said at least one transmitted data item,
   wherein said programmable data management unit determines whether said at least one of said components of said set is compatible with one or more other components of said set, based on said at least one data item read from said information medium, and, if said at least one of said components of said set is compatible with said one or more other components of said set, said programmable data management unit controls said functional members to perform said required maintenance, and
   wherein said at least one data item includes sensor data from a sensor on a component of said components, said sensor data providing a current condition of said component.

26. The machine according to claim 25,
   wherein said functional members are configured to perform tire mounting/removal operations, and
   wherein said sensor data includes pressure data of a tire when stopped and pressure data of said tire while running.

27. The machine according to claim 26, further comprising an inflation appliance.

28. The machine according to claim 25, wherein said functional members are configured to perform tire inflation operations.

29. The machine according to any one of claims 25 to 28, wherein said programmable data management unit includes a memory containing a lookup table with identification data for all components to be assembled in a same set, and, for each item of identification data, a plurality of data relating to a type and dimensions of a corresponding component.

30. The machine according to any one of claims 25 to 28, wherein said transmitter includes a radio emitter/receiver connected to said programmable data management unit.

31. The machine according to any one of claims 25 to 28, wherein said reader includes an optical reader configured to read a code carried by a label constituting said information medium.

* * * * *